(12) United States Patent
de Souza et al.

(10) Patent No.: US 8,001,483 B2
(45) Date of Patent: Aug. 16, 2011

(54) SELECTIVE DISPLAY OF CURSOR

(75) Inventors: Jeremy de Souza, Redmond, WA (US);
Mohamed Sadek, Redmond, WA (US);
Pravin Kumar Santiago, Issaquah, WA
(US); Stephen H. Wright, Bothell, WA
(US)

(73) Assignee: Microsoft Corporation, Redmond, WA (US)

( * ) Notice: Subject to any disclaimer, the term of this patent is extended or adjusted under 35 U.S.C. 154(b) by 396 days.

(21) Appl. No.: 11/706,621

(22) Filed: Feb. 13, 2007

(65) Prior Publication Data

US 2008/0195979 A1    Aug. 14, 2008

(51) Int. Cl.
*G06F 3/048* (2006.01)
(52) U.S. Cl. .................. 715/779; 715/856; 715/720
(58) Field of Classification Search .............. 715/779, 715/856, 720
See application file for complete search history.

(56) References Cited

U.S. PATENT DOCUMENTS

| | | | | |
|---|---|---|---|---|
| 4,542,455 A * | 9/1985 | Demeure | ............ | 718/104 |
| 4,819,189 A | 4/1989 | Kikuchi et al. | | |
| 5,201,033 A | 4/1993 | Eagen et al. | | |
| 5,586,196 A * | 12/1996 | Sussman | ............ | 382/114 |
| 5,917,486 A * | 6/1999 | Rylander | ............ | 715/764 |
| 5,995,102 A * | 11/1999 | Rosen et al. | ............ | 715/856 |
| 6,005,550 A | 12/1999 | Vaughan et al. | | |
| 6,040,821 A | 3/2000 | Franz et al. | | |
| 6,202,212 B1 * | 3/2001 | Sturgeon et al. | ............ | 725/141 |
| 6,219,028 B1 | 4/2001 | Simonson | | |
| 6,504,547 B1 | 1/2003 | Mercer | | |
| 6,597,383 B1 | 7/2003 | Saito | | |
| 6,639,613 B1 * | 10/2003 | Nason et al. | ............ | 715/778 |
| 7,114,018 B1 | 9/2006 | Maity et al. | | |
| 2006/0036971 A1 | 2/2006 | Mendel et al. | | |
| 2006/0095867 A1 * | 5/2006 | Rogalski et al. | ............ | 715/858 |
| 2006/0143571 A1 | 6/2006 | Chan | | |
| 2006/0150099 A1 | 7/2006 | Laff et al. | | |
| 2007/0094619 A1 * | 4/2007 | Shirai | ............ | 715/860 |

OTHER PUBLICATIONS

"Cursor.Hide Method (System.Windows)", http://msdn2.microsoft.com/en-us/library/system.windows.forms.cursor.hide.aspx.
"Cursor Hider", http://www.softexe.com/cursorhider.html.
"Camtasia Studio", http://www.techsmith.com/learn/camtasia/current/general/1209.1.asp.
"Learning to create a scanning cursor that shows the mouse coordinates", http://www.lukamaras.com/tutorials/cool-design/mouse-cursor-coordinates.html.
"Pygame.mouse", http://pygame.org/docs/ref/mouse.html.
"Technical Note TN 2007", http://developer.apple.com/technotes/tn/pdf/tn2007.pdf.
Arroyo, et al., "Usability Tool for Analysis of Web Designs Using Mouse Tracks", Date: 2006, pp. 484-489,http://delivery.acm.org/10.1145/1130000/1125557/p484-arroyo.pdfkey1=1125557&key2=8515745611&coll=GUIDE&dl=GUIDE&CFID=8281848&CFTOKEN=234143.

* cited by examiner

*Primary Examiner* — Tadeese Hailu
*Assistant Examiner* — Andrea Leggett
(74) *Attorney, Agent, or Firm* — Capitol City TechLaw; Richard C. Irving

(57) ABSTRACT

An application may be provided with an interface for hiding a cursor from or showing a cursor to a video driver and for causing cursor information to be saved in data storage and retrieved from data storage. The interface may include an application program interface (API), which may be callable from the application program. The interface may also include one or more bits included in a video driver, such that the modification of any of the one or more bits may change operation of the video driver. Modification of at least some of the bits may cause a cursor to be hidden from the video driver, may cause a previously hidden cursor to be shown to the video driver, may cause cursor information to be saved in a data storage, or may cause the cursor information to be retrieved from the data storage.

18 Claims, 7 Drawing Sheets

SELECTIVE DISPLAY OF CURSOR

BACKGROUND

A user of a processing device may have an impairment which may require the user to use an accessibility application on the processing device to compensate for the impairment. For example, if the user is visually impaired, the user may execute an accessibility application to magnify at least a portion of data displayed on a display screen of the processing device.

Existing accessibility applications such as, for example, a magnifier for magnifying at least a portion of data displayed on a display screen, may present the magnified data on the display screen in a different context. The accessibility applications also may magnify a system cursor in proportion with the magnified data. However, operating systems typically do not provide an application with a mechanism to hide an un-magnified system cursor from a video driver associated with a display screen. Instead, some third party applications use drivers to implement magnification to get around this problem. Thus, without using such third party applications, two cursors may be displayed on the display screen, a magnified cursor and an un-magnified cursor. Presentation of the two cursors on the display screen may tend to mislead and confuse the user.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, an application, which may be an accessibility application, may be provided with an interface for hiding a cursor from or showing a cursor to a video driver. The interface may also permit the application to cause cursor information to be saved and to cause previously saved cursor information to be retrieved at a later time in order to again show a previously hidden cursor to the video driver.

In various embodiments, the interface may include an application program interface (API), which may be callable from the application program. The interface may also include one or more bits included in a video driver, such that the application may modify any of the one or more bits to change operation of the video driver. For example, modification of at least some of the bits may cause a cursor to be hidden from the video driver, may cause a previously hidden cursor to be shown to the video driver, may cause cursor information to be saved in a data storage, or may cause the cursor information to be retrieved from the data storage.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, an interface such as, for example, an application program interface (API) or other interface, may be provided for an application, such as, for example, an accessibility application. In one embodiment, the accessibility application may be a magnifier, which magnifies at least a portion of data displayed on a display screen of a processing device. The interface may provide the accessibility application with a facility for hiding a cursor, such as, for example, a system cursor or other cursor, from a video driver and for showing a previously hidden cursor to the video driver. The interface may also provide a facility for saving information about the cursor, which may be used at a later time to show a previously hidden cursor.

In one embodiment, when a process, which causes the cursor to be hidden from a video driver, terminates, a check is made to determine whether other processes desire the cursor to be hidden from the video driver. If the check determines that at least one other process desires the cursor to be hidden from the video driver, then the cursor may remain hidden. Otherwise, the cursor may again be shown to the video driver.

Exemplary Processing Device

Figure 1:
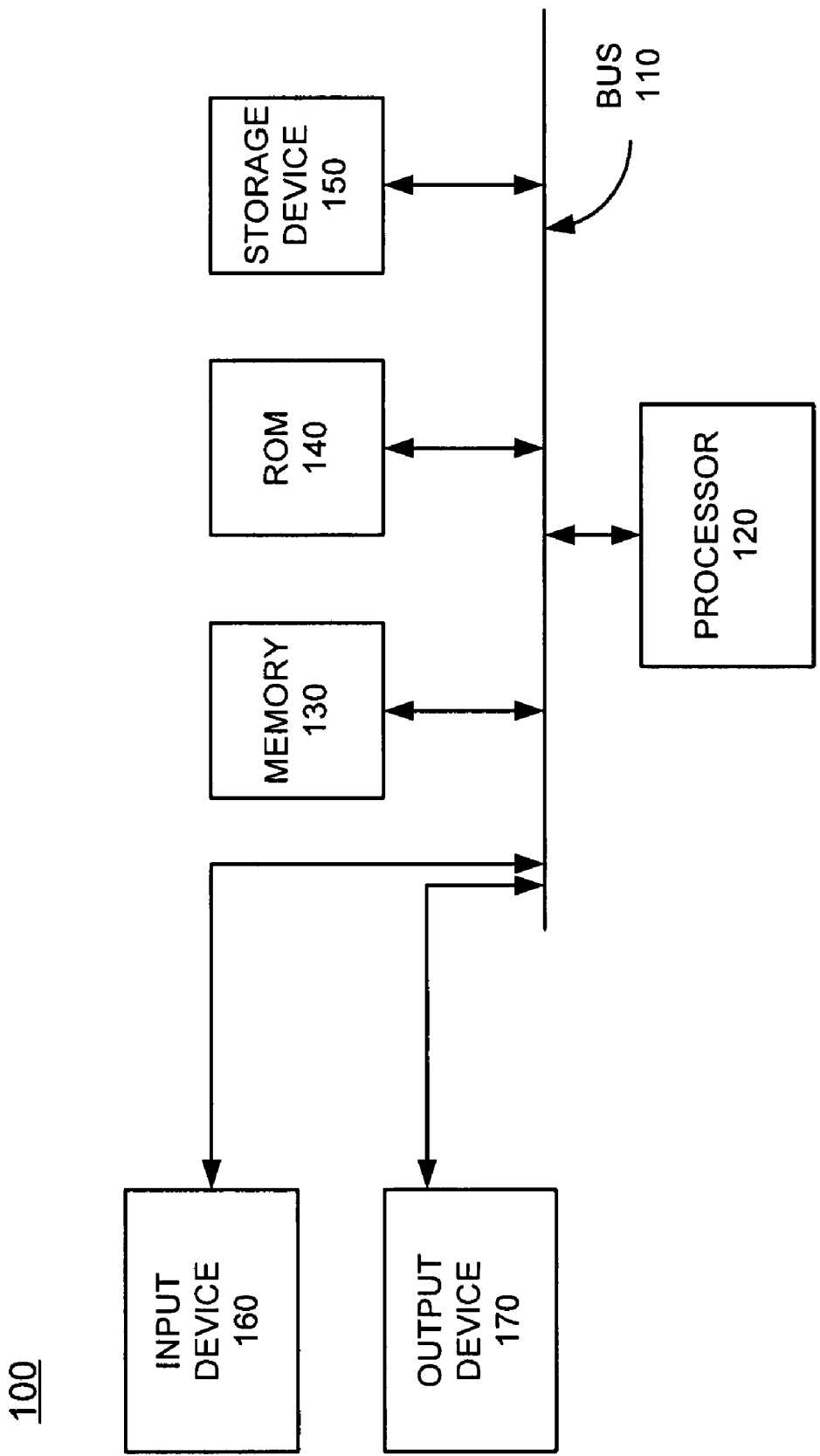
FIG. 1 is a functional block diagram of a processing device which may be used to implement embodiments consistent with the subject matter of this disclosure.

FIG. 1 is a functional block diagram of a processing device 100 which may be used to implement embodiments consistent with the subject matter of this disclosure. Processing device 100 may include a bus 110, a processor 120, a memory 130, a read only memory (ROM) 140, a storage device 150, an input device 160 and an output device 170.

Bus 110 may include a communication interface that permits communication among components of processing device 100. Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of tangible media for storing data and/or instructions. Input device 160 may include one or more conventional mechanisms that permit a user to input information to processing device 100, such as, for example, a keyboard, a mouse, or other input device. Output device 170 may include one or more conventional mechanisms that output information to the user, including a display, or other output device.

Processing device 100 may perform such functions in response to processor 120 executing sequences of instructions contained in a machine-readable medium, such as, for example, memory 130, or other tangible media. Such instructions may be read into memory 130 from another tangible machine-readable medium, such as storage device 150, or from a separate device via a communication interface (not shown).

Exemplary Operation

Figure 2:
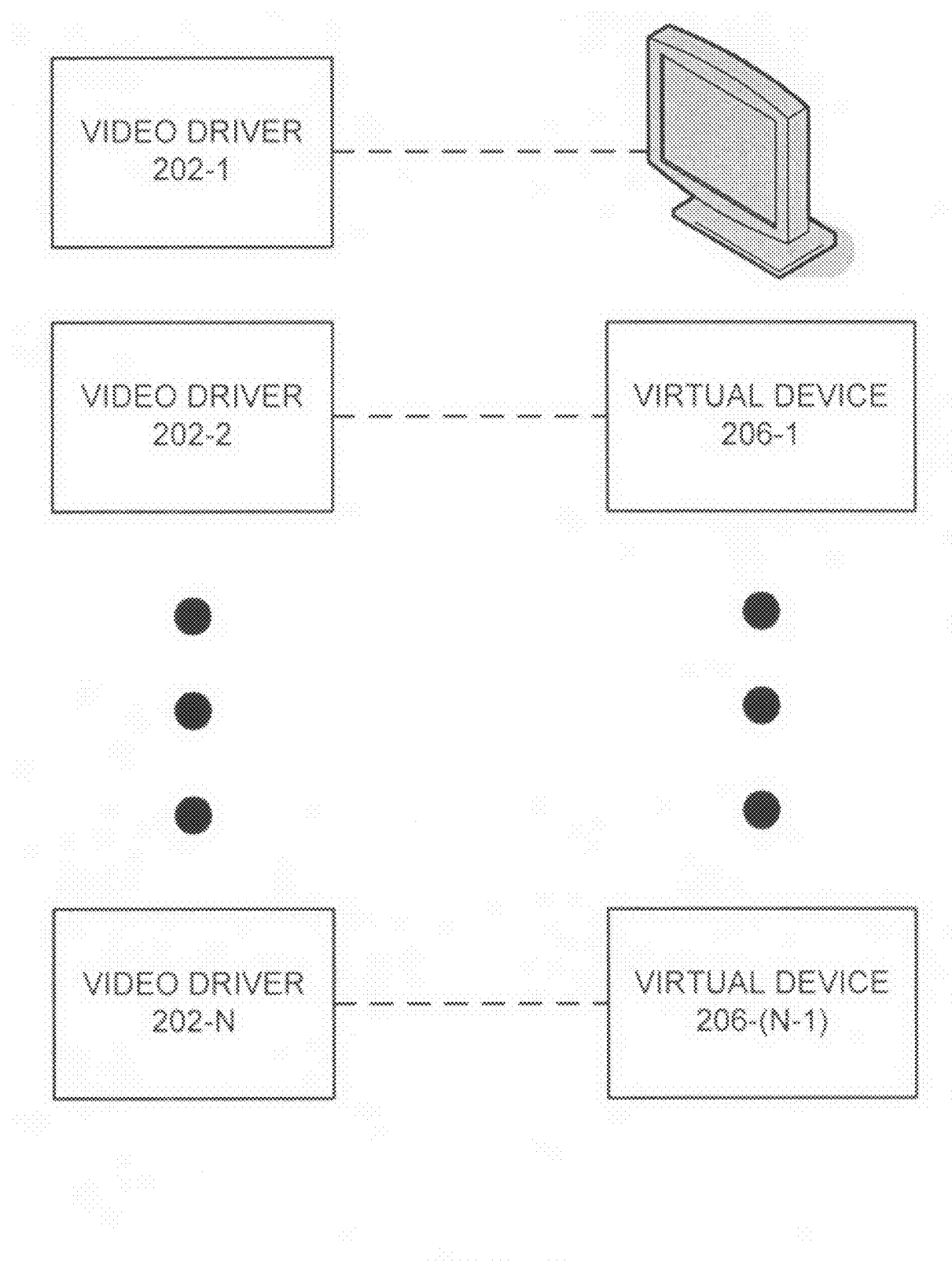
FIG. 2 is a diagram illustrating a relationship between video drivers and real or virtual devices.

FIG. 2 shows a number of video drivers 202-1, 202-2, . . . , 202-N which, in one embodiment, may reside in memory 130 of processing device 100. Video driver 202-1 may be a video driver associated with a display device 204 of a processing device. Video drivers 202-2, . . . 202-N may each be associated with a virtual device such as, for example, virtual devices 206-1, 206-2, . . . , 206-(N-1). In one embodiment consistent with the subject matter of this disclosure, video drivers 202-2, . . . , 202-N may be accessibility mirror drivers. A mirror driver is a display driver for a virtual device. The mirror driver may mirror operations of one or more physical display devices.

Figure 3A:
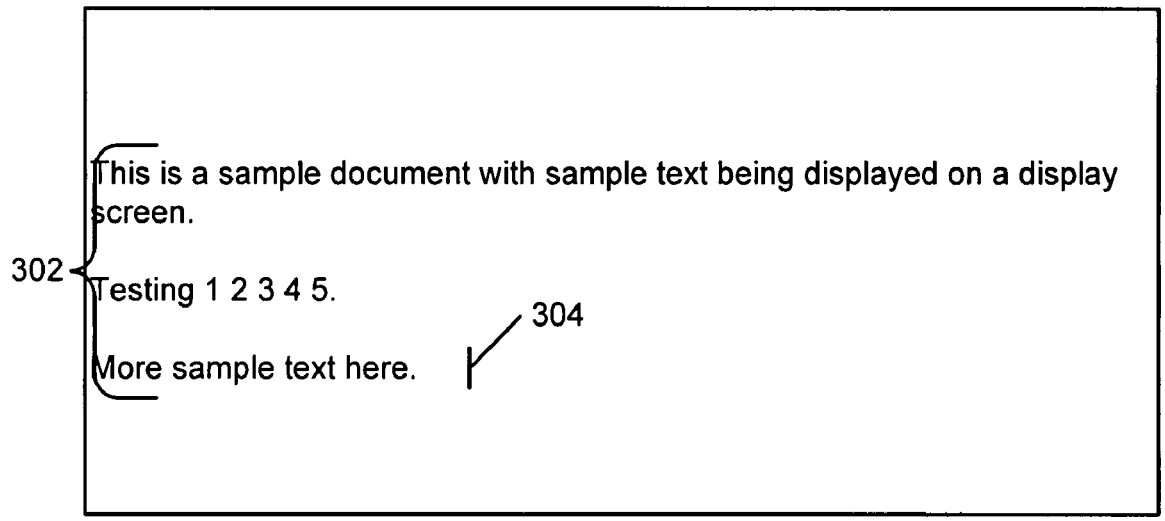
FIG. 3A illustrates an exemplary display screen before executing an accessibility application.

FIG. 3A illustrates text 302 being displayed on an exemplary display screen 300. In addition to text, a cursor 304 may be displayed on display screen 300. Cursor 304 may be a system cursor and may indicate a point at which input may be entered into a displayed file, or may indicate a point at which new output may be displayed.

Figure 3B:
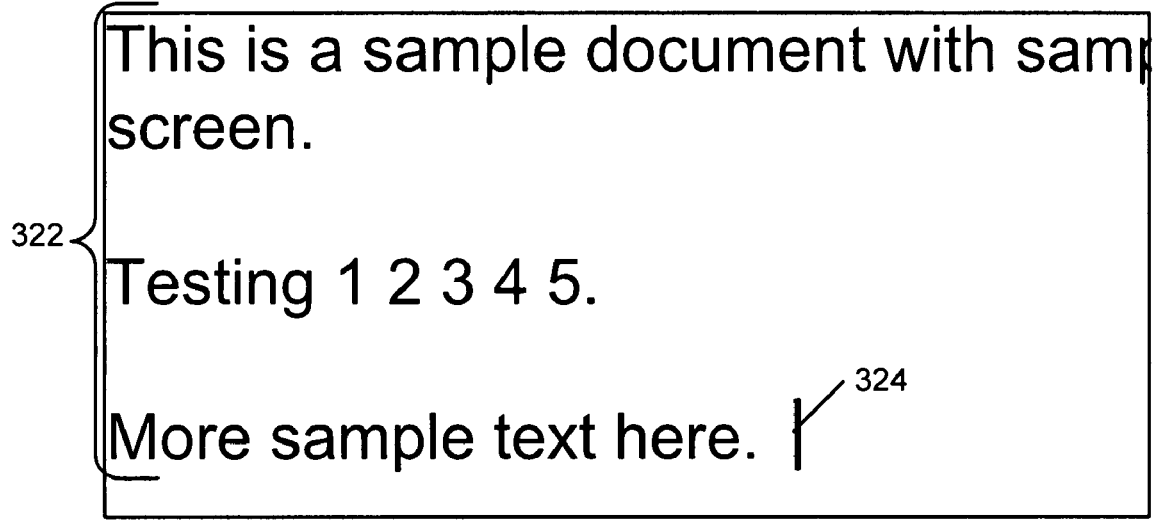
FIGS. 3B and 3C illustrate exemplary display screens after executing a magnifier accessibility application.

FIG. 3B illustrates exemplary display screen 320, in which at least a portion of text 302 of FIG. 3A may be displayed as magnified text 322, which is magnified via an accessibility application such as, for example, a magnifier. With respect to exemplary display screen 320, cursor 304 may be hidden from a video driver associated with a display device displaying display screen 320 and thus, cursor 304 may not appear on display screen 320. The accessibility application may create a magnified cursor 324, which may be shown to the video driver associated with the display device and, as a result, may be displayed on display screen 320. Note that in this example, magnified text may be displayed corresponding to lines of text 302 of display screen 300. Because of the magnification of the text on display screen 320, a portion of the magnified text may not appear on display screen 320. In some embodiments, the un-displayed magnified text may be displayed when a display window of display screen 320 is scrolled. The window of display screen 320 may be scrolled by using a number of different methods, including but not limited to using a pointing device such as, for example, a computer mouse or other pointing device, to click and drag a scrollbar (not shown) to thereby cause the displayed data of display screen 320 to scroll.

Figure 3C:
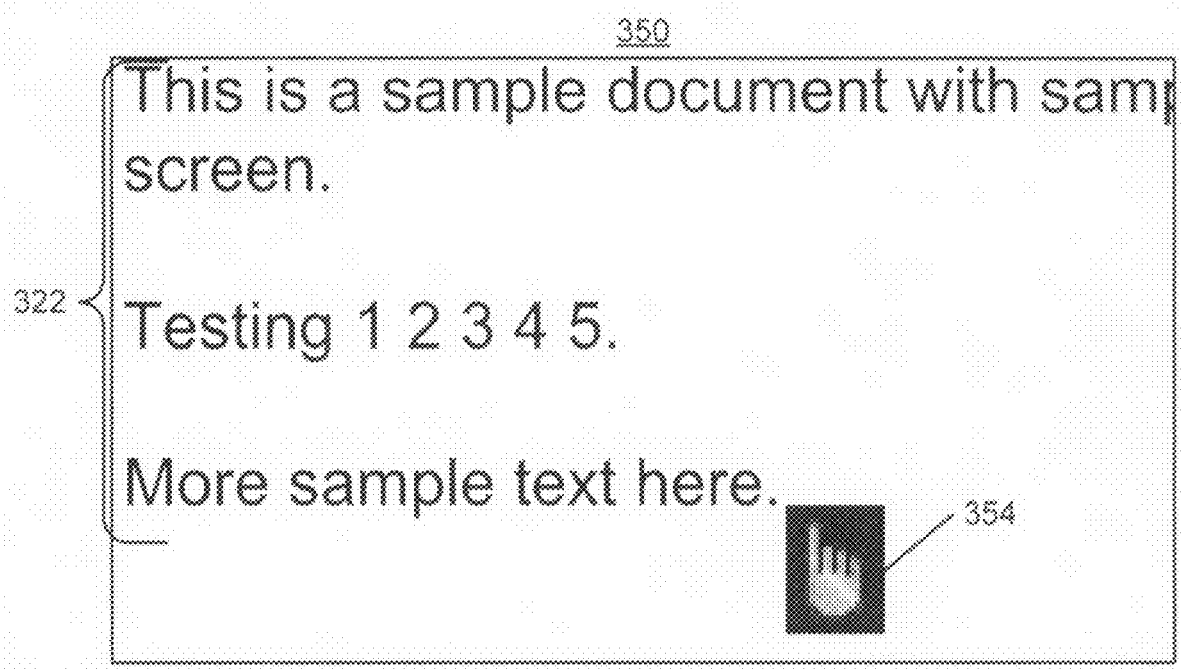

FIG. 3C shows another exemplary display screen 350, which is identical to display screen 320, with the exception of custom cursor 354 replacing magnified cursor 324. Custom cursor 354 may be created and provided to the video driver by the accessibility application. In other embodiments other types of accessibility applications, or other applications may create and provide a custom cursor or a magnified system cursor to the video driver.

Exemplary Processing

Figure 4:
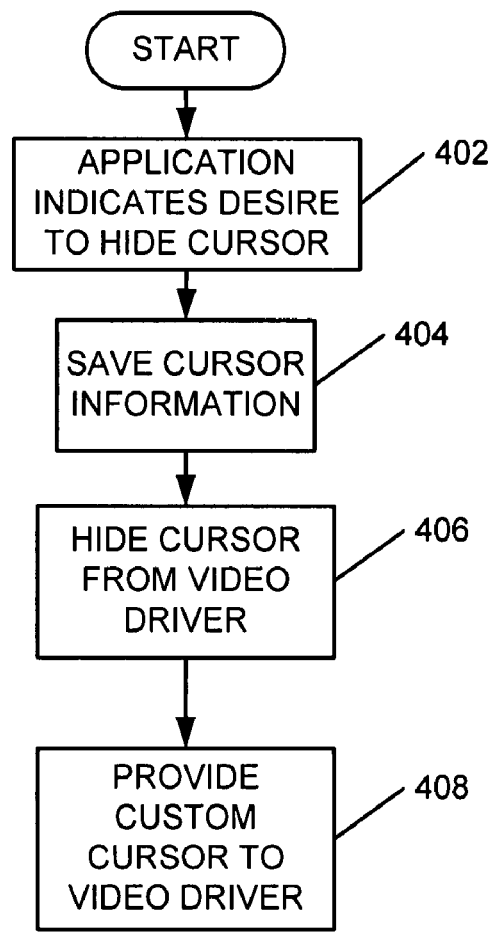
FIG. 4 is a flowchart illustrating an exemplary method for hiding a cursor from a video driver and providing a custom cursor to the video driver.

FIG. 4 is a flowchart illustrating an exemplary process for hiding a cursor from a video driver and for providing a custom cursor to the driver. The process may begin when an application such as, for example, an accessibility application, indicates a desire to hide a cursor such as, for example, a system cursor from a video driver (act 402). The application may indicate the desire to hide the cursor via an API or via setting one or more bits in a portion of a video driver to indicate properties of the video driver. This will be discussed in more detail at a later point in this specification.

Next, cursor information may be saved (act 404). In one embodiment, cursor information may be saved in a cache. The saved cursor information may include, but not be limited to, data with respect to an appearance of the cursor, a position of the cursor on a display screen, as well as other information about cursor. The cursor may now be hidden from the video driver, such that the video driver may not receive or process any information with respect to the cursor (act 406). The application may then create and provide a custom cursor to the video driver (act 408). In some embodiments in which the accessibility application is a magnifier for magnifying at least a portion of contents of a display screen, the custom cursor may be a magnified version of a system cursor. The magnified version of the cursor may be magnified in proportion to the magnified contents of the display screen. In other embodiments, the custom cursor may be another type of cursor.

The process illustrated by the flowchart of FIG. 4 is exemplary. For example, in other embodiments, the cursor information may be saved at other points in time, rather than just before hiding the cursor from the video driver. In some embodiments, the cursor information may be saved or cached whenever the cursor is moved. In other embodiments, the cursor information may be saved or cached at periodic time intervals.

Figure 5:
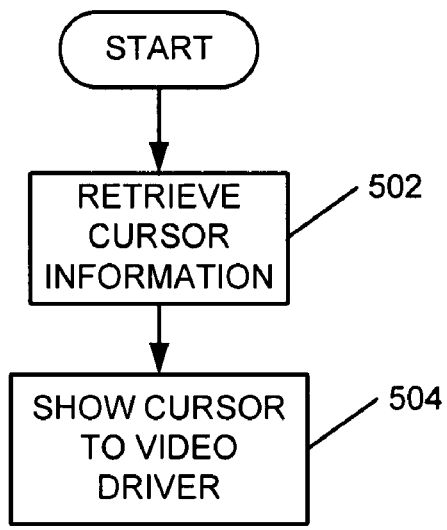
FIG. 5 is a flowchart illustrating an exemplary method for retrieving cursor information from data storage and showing a previously hidden cursor to a video driver.

FIG. 5 is a flowchart that illustrates an exemplary process for showing a previously hidden cursor to a video driver. First, cursor information may be retrieved from data storage such as, for example, a cache or other data storage (act 502). The cursor information may be provided to the video driver and the cursor may again be shown to the video driver and may be restored to its previous appearance and position as saved in the data storage.

Interface

In embodiments consistent with the subject matter of this disclosure, an application such as, for example, an accessibility application or other application, may employ an application program interface (API) to hide a cursor such as, for example, a system cursor or other cursor, from a video driver or to show a previously hidden cursor to the video driver. The API may also be employed by the application to save cursor information into, for example, a cache or other data storage, or to retrieve previously saved cursor information from, for example, the cache or the other data storage.

Figure 6:
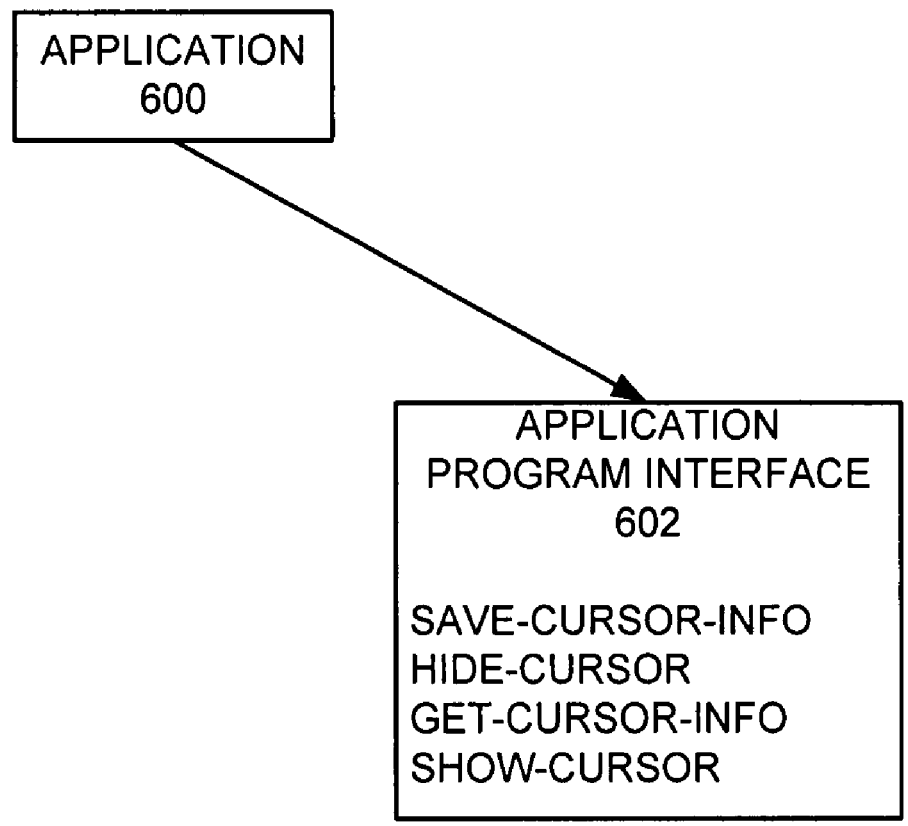
FIG. 6 is a block diagram illustrating an application using an application program interface (API) to hide or show a cursor and to save or get cursor information.

FIG. 6 is a functional block diagram which illustrates an application 600 such as, for example, an accessibility application, using a number of facilities such as, for example, callable functions or routines, provided by API 602. Exemplary API 602 may provide the callable functions or routines such as, for example, SAVE-CURSOR-INFO, HIDE-CURSOR, GET-CURSOR-INFO, SHOW-CURSOR, or additional or other callable functions or routines.

SAVE-CURSOR-INFO may save cursor information such as, for example, data indicative of an appearance of the cursor, a position of the cursor, a size of the cursor, as well as different or other cursor information. The cursor information may be saved in memory, a cache, or other data storage.

HIDE-CURSOR may prevent a video driver from being provided with cursor information. Thus, the cursor may be hidden from the video driver and its associated display device.

GET-CURSOR-INFO may retrieve the cursor information previously saved by SAVE-CURSOR-INFO. The data may be retrieved from a data cache or other data storage and may include data indicative of an appearance of the cursor, a position of the cursor, a size of the cursor, as well as different or other cursor information.

SHOW-CURSOR may cause a previously hidden cursor to be shown to a video driver. In some embodiments, SHOW-CURSOR may be called after retrieving saved cursor information by first calling GET-CURSOR-INFO.

Figure 7:
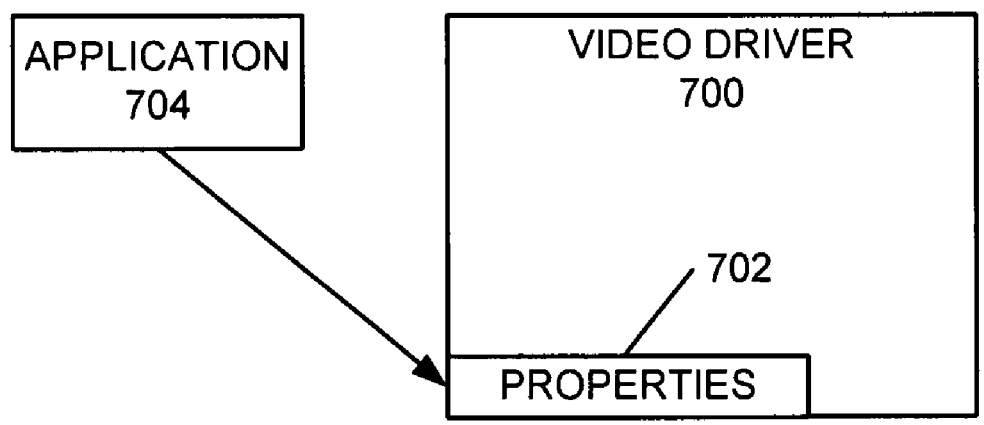
FIG. 7 is a block diagram illustrating an application modifying one or more bits of a video driver in order to change operation of the video driver.

FIG. 7 illustrates another interface by which an application such as, for example, an accessibility application, may indicate a desire to hide a cursor from or show the cursor to a video driver. In this embodiment, a video driver 700 may include a number of bits, which may be contiguous bits, indicating properties 702 of video driver 700. A setting of one or more bits of properties 702 may indicate that the cursor is to be hidden from video driver 700, that a previously hidden cursor is to be shown to video driver 700, that cursor is to be saved or cached, or that cursor information is to be accessed from data storage or a cache. In other embodiments, other bits may indicate additional or different properties. Application 704, which in some embodiments may be an accessibility application, may alter one or more bits of properties 702 to hide a cursor from or show the cursor to video driver 700, to save cursor information in a cache or data storage, or to retrieve the previously saved cursor information from the cache or data storage. In some embodiments, alteration of one or more bits of properties 702 may cause different or other functions or features to be enabled or disabled.

In one embodiment consistent with the subject matter of this disclosure, API 602 may be used by application 600 to hide a cursor from or show a cursor to a video driver associated with a physical device such as, for example, a physical display device. Video driver 700 may be a video driver associated with a virtual display device such as, for example, a mirror driver.

In embodiments consistent with the subject matter of this disclosure, whether a cursor is shown to or hidden from one video driver is independent from whether a cursor is shown to or hidden from another video driver. For example, a cursor may be hidden from a video driver associated with a physical display device, while a cursor is hidden from a second video driver associated with a virtual display device, or vice versa.

Arbitration and Process Lifetime Management

Figure 8:
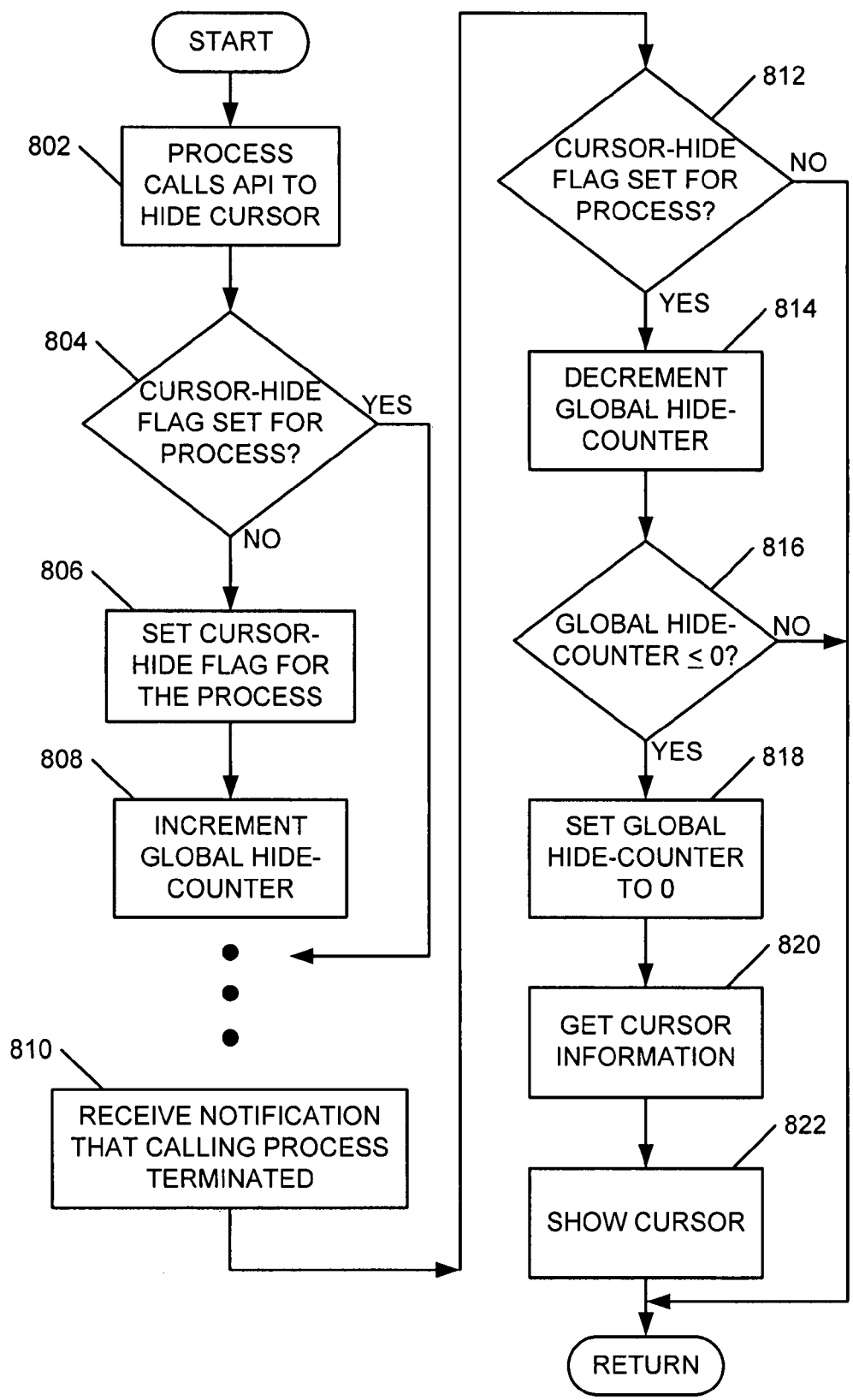
FIG. 8 is a flowchart illustrating an exemplary method consistent with the subject matter of this disclosure.

A process of an application such as, for example, an accessibility application, may use API 602 or properties 702 to hide a cursor from a video driver and may then willfully terminate or be terminated before using API 602 or properties 702 to indicate that the cursor is again to be shown to the video driver. In such a situation, the cursor may remain hidden from the video driver indefinitely. FIG. 8 is a flowchart that illustrates an exemplary method that may be implemented in embodiments consistent with the subject matter of this disclosure to prevent the above situation from keeping the cursor hidden from the video driver indefinitely.

The method may begin with a process calling API 602 or changing one or more bits of properties 702 to indicate a desire to hide a cursor from a video driver (act 802). A flag such as, for example, CURSOR-HIDE, may then be checked to determine whether the flag is set (act 804). The flag may be set when a process indicates a desire to hide a cursor from a video driver. If the check determines that the flag is not set, then the calling process is requesting a cursor to be newly hidden from the video driver and the flag, for example, CURSOR-HIDE, may now be set (act 806). Next, a counter such as, for example, a global HIDE-COUNTER may be incremented (act 808).

In some embodiments, the global counter, for example, HIDE-COUNTER, may be incremented each time a process newly requests a cursor to be hidden from a particular video driver. For example, if the process previously requested the cursor to be hidden from the particular video driver and had not since requested that the cursor be shown to the particular video driver, when the process again indicates a desire for the cursor to be hidden from the particular video driver, then the global counter may not be incremented because the process already indicated that the cursor should be hidden.

If, at act 804, the check determines that the flag is set, then the process already indicated that the cursor is to be hidden from the video driver and acts 806 and 808 are not performed.

At a later point, the process indicating that the cursor is to be hidden from the video driver may terminate. In some cases, the termination may occur without the process indicating that the cursor is again to be shown to the video driver. When the process terminates, a notification may be received indicating that the process terminated (act 810). In this way, a lifetime of a process may be tracked. At this point, a check may be performed to determine if the flag, for example, the CURSOR-HIDE flag, is set for the terminated process (act 812). If the flag is set, then the process terminated without indicating that the cursor is again to be shown to the video driver. Otherwise, the process terminated while the cursor was not hidden and the process is completed.

If the flag is set, the counter, for example, the global HIDE-COUNTER, may be decremented (act 814). Another check may be performed to determine if the counter now has a value less than or equal to 0 (act 816). If the counter is determined not to have a value less than or equal to 0, then there is at least one other process that has requested the cursor to be hidden from the video driver and the method is completed.

If, at act 816, the counter is determined to be less than or equal to 0, then the counter may be set to 0 (act 818). Next, cursor information for the hidden cursor may be retrieved (act 820). The cursor information may have been previously saved or cached and may include data with respect to an appearance of the cursor, a position of the cursor, a size of the cursor, or additional or other cursor data. Using the retrieved cursor information, the cursor information may be provided to the API or the video driver and the cursor may again be shown to the video driver (act 822).

The method illustrated by a flowchart of FIG. 8 is exemplary. In other embodiments, an order of acts of the method may be different, or the method may include additional or different acts.

The global counter mentioned, with respect to acts 808, 814 and 818, may aid in arbitrating among multiple processes, each of which may indicate a desire to either hide a cursor from a particular video driver or show the cursor to the particular video driver. For example, as each separate process newly indicates a desire to hide the cursor from the particular video driver, the global counter may be incremented. As each of the processes indicates a desire to again show the cursor to the particular video driver, the global counter may be decremented. In some embodiments, a hidden cursor may again be shown to the particular video driver only when the global counter is less than or equal to 0. Thus, in some embodiments, if at least one process indicates a desire to hide the cursor from the particular video driver, then the cursor is hidden from the particular video driver.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A processing device-implemented method, for use with an application, for selectively hiding or showing a system cursor, the method comprising:
    performing, in response to a first process indicating a desire to hide the system cursor, the first process being one of a plurality of processes that request the system cursor to be hidden:
        hiding the system cursor from a video driver in preparation for executing the application,
        creating, by the application, a custom cursor having a different size than the system cursor, and
        providing, by the application, the custom cursor to the video driver;
    receiving a notification indicating that a second process of the plurality of processes is terminated;
    determining, in response to receiving the notification, whether a cursor-hide flag for the second process indicates that the second process hid the system cursor when the second process terminated;
    deciding, when the determining determines that the cursor-hide flag for the second process indicates that the second process hid the system cursor when the second process terminated, whether to keep the system cursor hidden from the video driver or to show the system cursor to the video driver, the deciding being based on whether at least one process of the plurality of processes, other than the second process, currently desires the system cursor to be hidden from the video driver;
    preventing a restoring of the system cursor, in response to receiving the notification, when the deciding decides to keep the system cursor hidden from the video driver based on the at least one process of the plurality of processes, other than the second process, currently desiring the system cursor to be hidden from the video driver; and
    restoring the system cursor, in response to receiving the notification, when the deciding decides to show the system cursor to the video driver based on no process of the plurality of processes, other than the second process, currently desiring the system cursor to be hidden from the video driver; and
    wherein the method is implemented on a processing device.

2. The method of claim 1, further comprising caching information with respect to a position and an appearance of the system cursor.

3. The method of claim 1, further comprising:
    retrieving saved information about the system cursor; and
    showing the system cursor to the video driver after exiting the application, a position and an appearance of the system cursor having been restored from the saved information about the system cursor.

4. The method of claim 1, further comprising:
    calling an application program interface to save information about the system cursor and to hide the system cursor from the video driver.

5. The method of claim 1, further comprising showing the system cursor to a second video driver while performing the hiding of the system cursor from the video driver, wherein
    the video driver is associated with a primary display, and
    the second video driver is associated with a virtual device.

6. The processing device-implemented method of claim 1, wherein:
    the application is an accessibility application which magnifies at least a portion of contents of a display screen, and
    the custom cursor is a magnified version of the system cursor, the custom cursor being magnified in proportion to the magnified contents of the display screen.

7. The processing device-implemented method of claim 1, wherein the first process indicates a desire to hide the system cursor by setting one or more bits within the video driver.

8. The processing device-implemented method of claim 7, wherein the one or more bits within the video driver are included within a plurality of contiguous bits of the video driver that indicate whether the system cursor is to be shown to or hidden from the video driver, whether the system cursor is to be saved, and whether cursor information is to be accessed from data storage or a cache.

9. A processing device comprising:
    at least one processor;
    a memory for storing data and instructions for the at least one processor; and
    a communication interface connecting the at least one processor and the memory, wherein the memory includes, stored therein, machine-readable instructions for the processing device to perform a method comprising:
        providing an application program interface, callable from an accessibility application executing on the processing device, for compensating for a visual impairment of a user,
        calling the application program interface, by a first process of the accessibility application, to save information about a system cursor and to perform:
            setting a cursor-hide flag for the first process, and hiding the system cursor from a video driver, creating, by the accessibility application, a custom cursor having a larger size than the system cursor, providing, by the accessibility application, the custom cursor to the video driver, receiving a notification indicating that a second process of a plurality of processes that request the system cursor to be hidden is terminated, determining, in response to receiving the notification, whether a cursor-hide flag for the second process indicates that the second process hid the system cursor when the second process terminated, deciding, when the determining determines that the cursor-hide flag for the second process indicates that the second process hid the system cursor when the second process terminated, whether to keep the system cursor hidden from the video driver or to show the system cursor to the video driver, the deciding being based on whether at least one process of the plurality of processes, other that the second process, currently desires the system cursor to be hidden from the video driver, and restoring the system cursor, in response to receiving the notification, such that the system cursor is shown to the video driver when the deciding decides to show the system cursor to the video driver based on no process of the plurality of processes, other than the second process, currently desiring the system cursor to be hidden from the video driver, and preventing the restoring of the system cursor, in response to receiving the notification, when the deciding decides to keep the system cursor hidden from the video driver based on the at least one process of the plurality of processes, other than the second process, currently desiring the system cursor to be hidden from the video driver.

10. The processing device of claim 9, wherein the method further comprises:

controlling whether a second video driver receives or is prevented from receiving information with respect to displaying a cursor, the controlling of whether the second video driver receives or is prevented from receiving the information with respect to displaying the cursor being independent of whether the system cursor is hidden from the video driver or shown to the video driver.

11. The processing device of claim 9, wherein the calling of the application program interface to save information about a system cursor further comprises caching information with respect to a position and an appearance of the system cursor.

12. The processing device of claim 9, wherein the method further comprises:

providing custom mouse cursor data to the video driver when the system cursor is hidden from the video driver.

13. The processing device of claim 9, wherein the method further comprises:

providing custom mouse cursor data to the video driver when the system cursor is hidden from the video driver; and hiding custom mouse cursor data from the video driver.

14. The processing device of claim 9, wherein the method further comprises:

showing the system cursor to a second video driver while hiding the system cursor from the video driver, the video driver being associated with a physical display, and the second video driver being associated with a virtual device.

15. An article comprising a tangible machine-readable medium having machine-readable instructions embodied therein, the machine-readable instructions adapted to be executed to implement a method on a processing device, the method comprising:

calling an application program interface, by an accessibility application executing on the processing device, to save information about a cursor, the accessibility application being arranged to compensate for a visual impairment of a user;

calling the application program interface, by a first process of the executing accessibility application, to hide the cursor from a video driver;

creating, by the accessibility application, a custom cursor having a different size than the cursor;

providing, by the accessibility application, the custom cursor to the video driver;

receiving a notification indicating that a second process of a plurality of processes that request the cursor to be hidden from the video driver is terminated;

determining, in response to receiving the notification, whether a cursor-hide flag for the second process indicates that the second process hid the cursor when the second process terminated;

deciding, when the determining determines that the cursor-hide flag for the second process indicates that the second process hid the cursor when the second process terminated, whether to keep the cursor hidden from the video driver or to show the cursor to the video driver, the deciding being based on whether at least one process of the plurality of processes, other than the second process, currently desires the cursor to be hidden from the video driver, restoring, when the deciding decides to show the cursor to the video driver, the cursor in response to receiving the notification, based on no process of the plurality of processes, other than the second process, currently desiring the cursor to be hidden from the video driver; and preventing the restoring of the cursor, in response to receiving the notification, when the deciding decides to keep the cursor hidden from the video driver based on the at least one process of the plurality of processes, other than the second process, currently desiring the cursor to be hidden from the video driver.

16. The article of claim 15, wherein when the application program interface is called to save information about a cursor, information with respect to a position and an appearance of the cursor is cached.

17. The article of claim 15, wherein the method further comprises:

hiding the cursor from or showing the cursor to any one of a plurality of video drivers independently from hiding the cursor from or showing the cursor to another one of the plurality of video drivers.

18. The article of claim 17, wherein:

one of the plurality of video drivers is associated with a physical display, and others of the plurality of video drivers are associated with virtual devices.

* * * * *